United States Patent
Lee et al.

(10) Patent No.: US 11,096,103 B2
(45) Date of Patent: Aug. 17, 2021

(54) METHOD FOR REPORTING MEASUREMENT RESULT AND DEVICE SUPPORTING THE SAME

(71) Applicant: LG Electronics Inc., Seoul (KR)

(72) Inventors: Youngdae Lee, Seoul (KR); Hongsuk Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/631,074

(22) PCT Filed: Aug. 13, 2018

(86) PCT No.: PCT/KR2018/009256
§ 371 (c)(1),
(2) Date: Jan. 14, 2020

(87) PCT Pub. No.: WO2019/031943
PCT Pub. Date: Feb. 14, 2019

(65) Prior Publication Data
US 2020/0162977 A1    May 21, 2020

Related U.S. Application Data

(60) Provisional application No. 62/544,005, filed on Aug. 11, 2017, provisional application No. 62/563,136, filed on Sep. 26, 2017.

(51) Int. Cl.
*H04W 36/00* (2009.01)
*H04W 16/18* (2009.01)
*H04W 8/24* (2009.01)

(52) U.S. Cl.
CPC .......... *H04W 36/0088* (2013.01); *H04W 8/24* (2013.01); *H04W 16/18* (2013.01)

(58) Field of Classification Search
CPC .. H04W 36/0088; H04W 8/245; H04W 16/18
(Continued)

(56) References Cited

U.S. PATENT DOCUMENTS 9,913,202 B2 * 3/2018 Xu .................... H04W 36/0094
2009/0143093 A1    6/2009 Somasundaram et al.
(Continued)

FOREIGN PATENT DOCUMENTS

| CN | 103458469 | 12/2013 |
| EP | 2222109 | 8/2010 |

(Continued)

OTHER PUBLICATIONS

Extended European Search Report in European Appln. No. 18845038.1, dated May 19, 2020, 13 pages.
(Continued)

*Primary Examiner* — Danh C Le
(74) *Attorney, Agent, or Firm* — Fish & Richardson P.C.

(57) ABSTRACT

Provided are a method of reporting measurement result and a device supporting the method. According to one embodiment of the present invention, a method for reporting measurement result in a wireless communication system includes: measuring an operating status of the UE; receiving a threshold for the reporting the measurement result, from network; and adjusting a report related time value by comparing the operating status and the received threshold, wherein the operating status is at least one of altitude of the UE and a number of detected cells.

16 Claims, 8 Drawing Sheets

(58) Field of Classification Search
USPC .................. 370/332, 310.2; 455/423
See application file for complete search history.

(56) References Cited

U.S. PATENT DOCUMENTS

| | | | |
|---|---|---|---|
| 2013/0210435 A1* | 8/2013 | Dimou | H04W 36/0085 455/436 |
| 2014/0057664 A1* | 2/2014 | Pei | G01S 5/0215 455/456.5 |
| 2014/0355484 A1* | 12/2014 | Foster | H04W 16/18 370/255 |
| 2015/0281989 A1 | 10/2015 | Yang et al. | |
| 2015/0304862 A1* | 10/2015 | Nagaraja | H04W 24/02 455/418 |
| 2015/0358890 A1* | 12/2015 | Xu | H04W 8/02 455/437 |
| 2017/0163336 A1 | 6/2017 | Jalali et al. | |
| 2017/0188281 A1* | 6/2017 | Li | H04W 36/0083 |
| 2018/0160346 A1* | 6/2018 | Lee | H04W 36/08 |
| 2018/0279187 A1* | 9/2018 | Zingler | H04W 36/0083 |
| 2019/0246323 A1* | 8/2019 | Kim | H04W 36/00835 |
| 2020/0059835 A1* | 2/2020 | Kim | H04W 36/0058 |

FOREIGN PATENT DOCUMENTS

| | | |
|---|---|---|
| WO | WO2013111997 | 8/2013 |
| WO | WO2015115835 | 8/2015 |

OTHER PUBLICATIONS

KDDI, Proposal of potential LTE enhancements for Aerial Vehicles, R2-1705999, 3GPP TSG-RAN2 Meeting #98, Hangzhou, China, May 15-19, 2017, 5 pages.

LG Electronics Inc., Mobility Enhancement using MR Triggering, R2-1806135, 3GPP TSG-RAN WG2 Meeting #101bis, Sanya, China, Apr. 16-Apr. 20, 2018, 3 pages.

Nokia, Alcatel-Lucent Shanghai Bell, Potential mobility issues for air-borne UEs, R2-1704321, 3GPP TSG-RAN WG2 Meeting #98, Hangzhou, China, May 15-19, 2017, 4 pages.

\* cited by examiner

[Fig. 1]
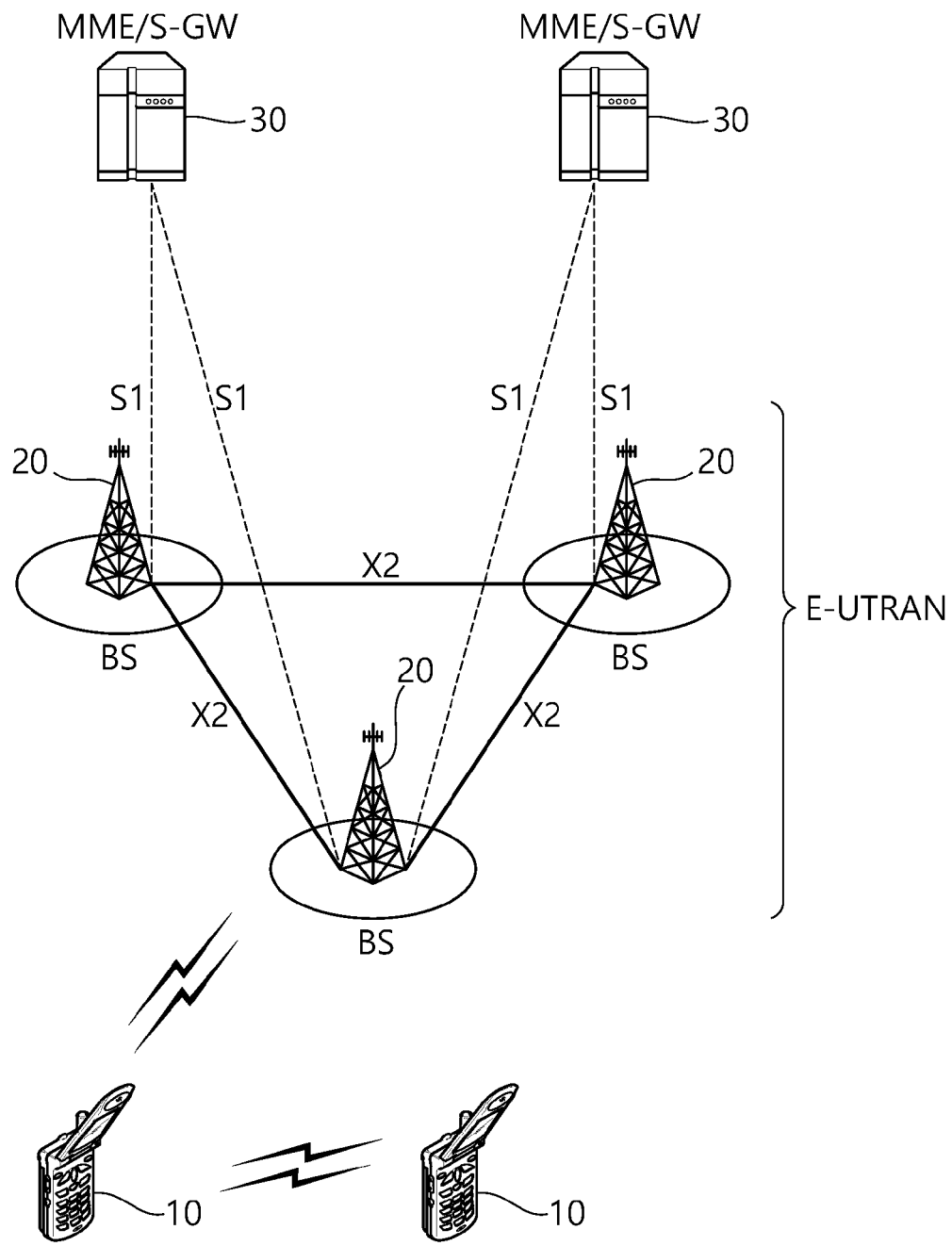

[Fig. 2]
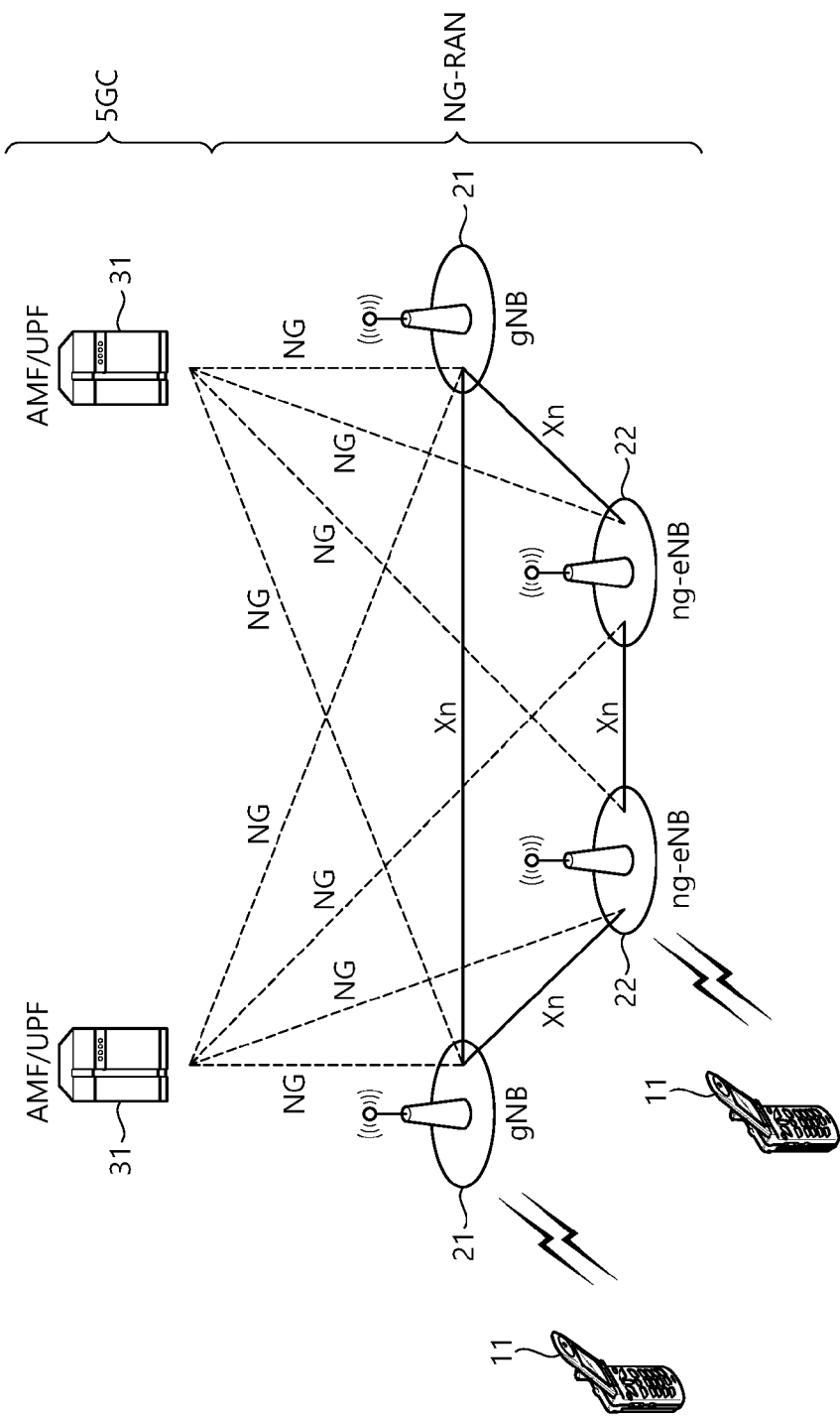

[Fig. 3]
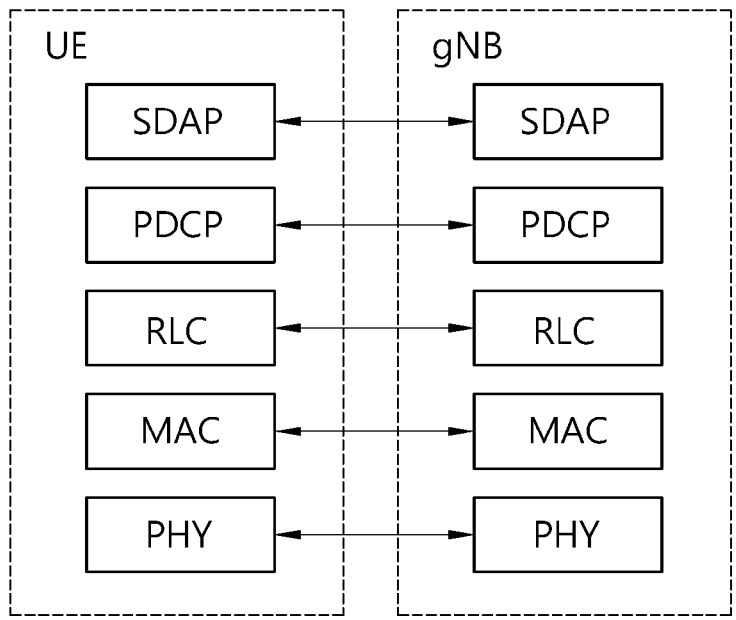
[Fig. 4]
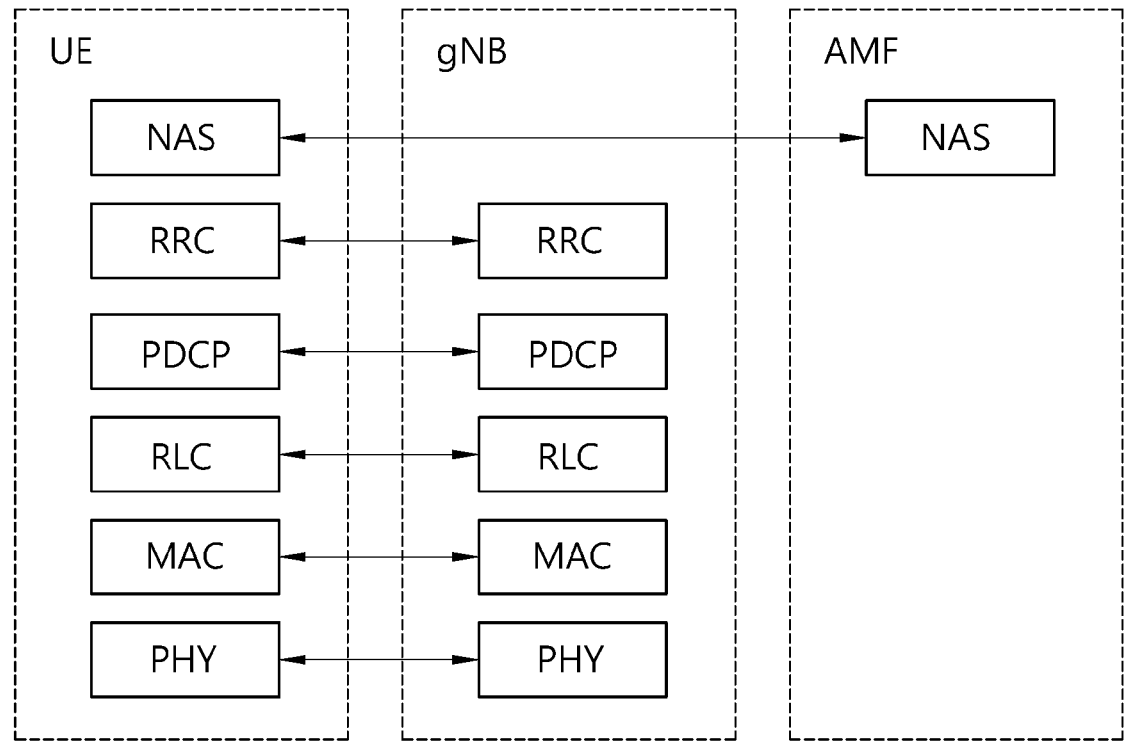

[Fig. 5]
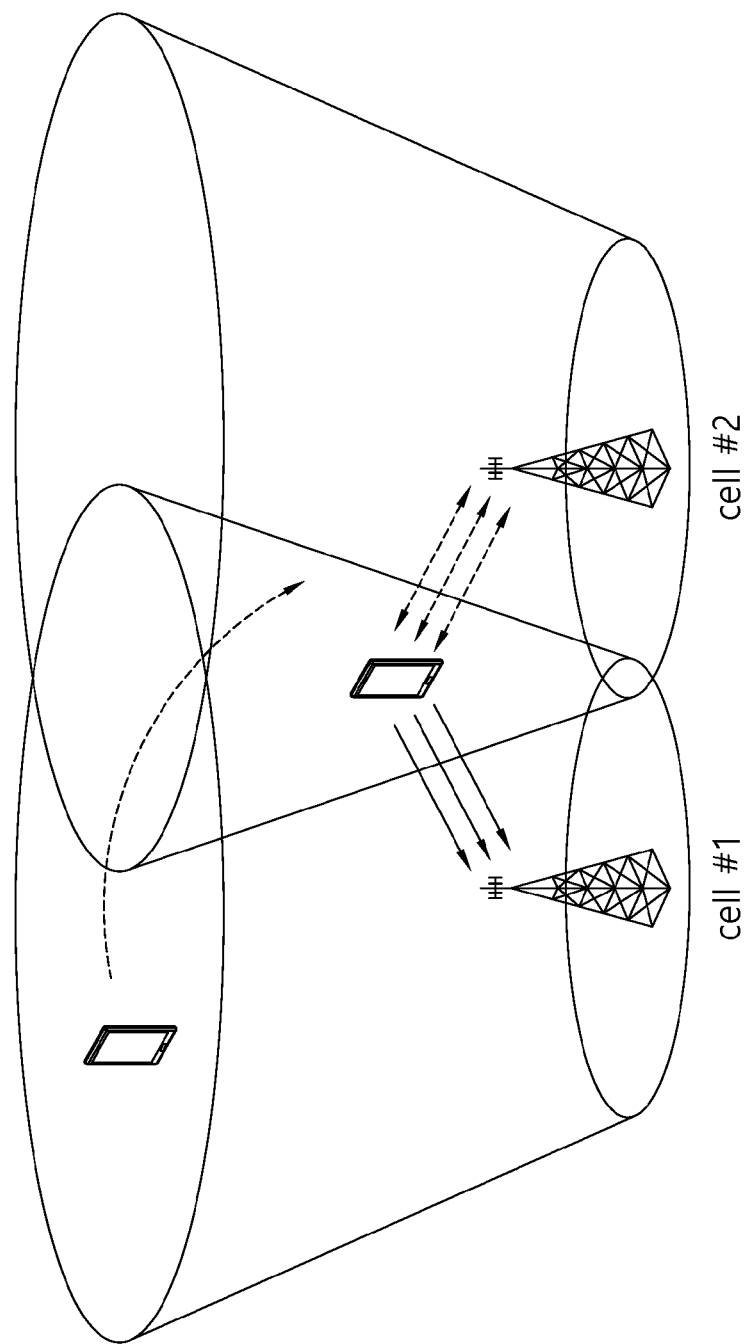

[Fig. 6]
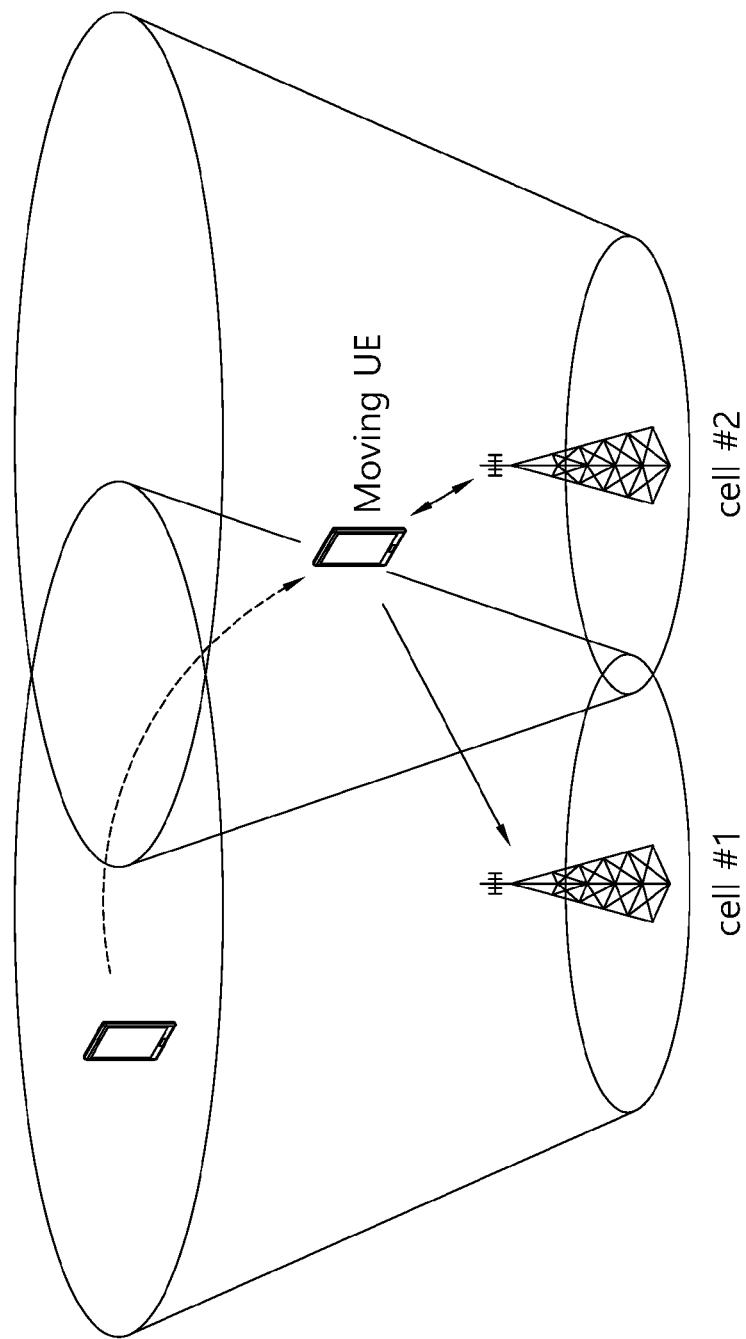

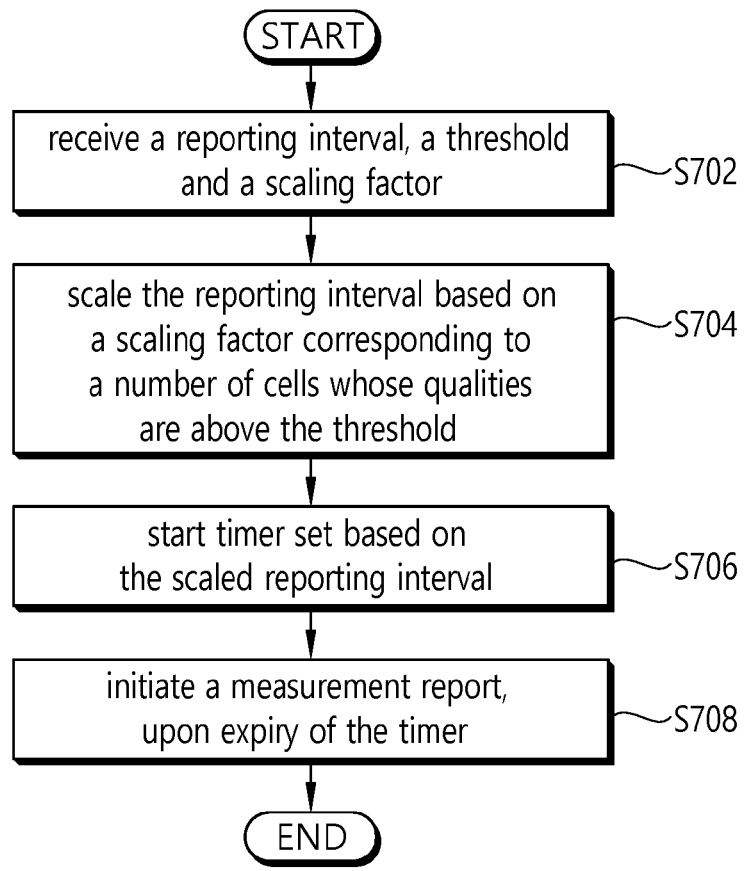
[Fig. 7]

[Fig. 8]
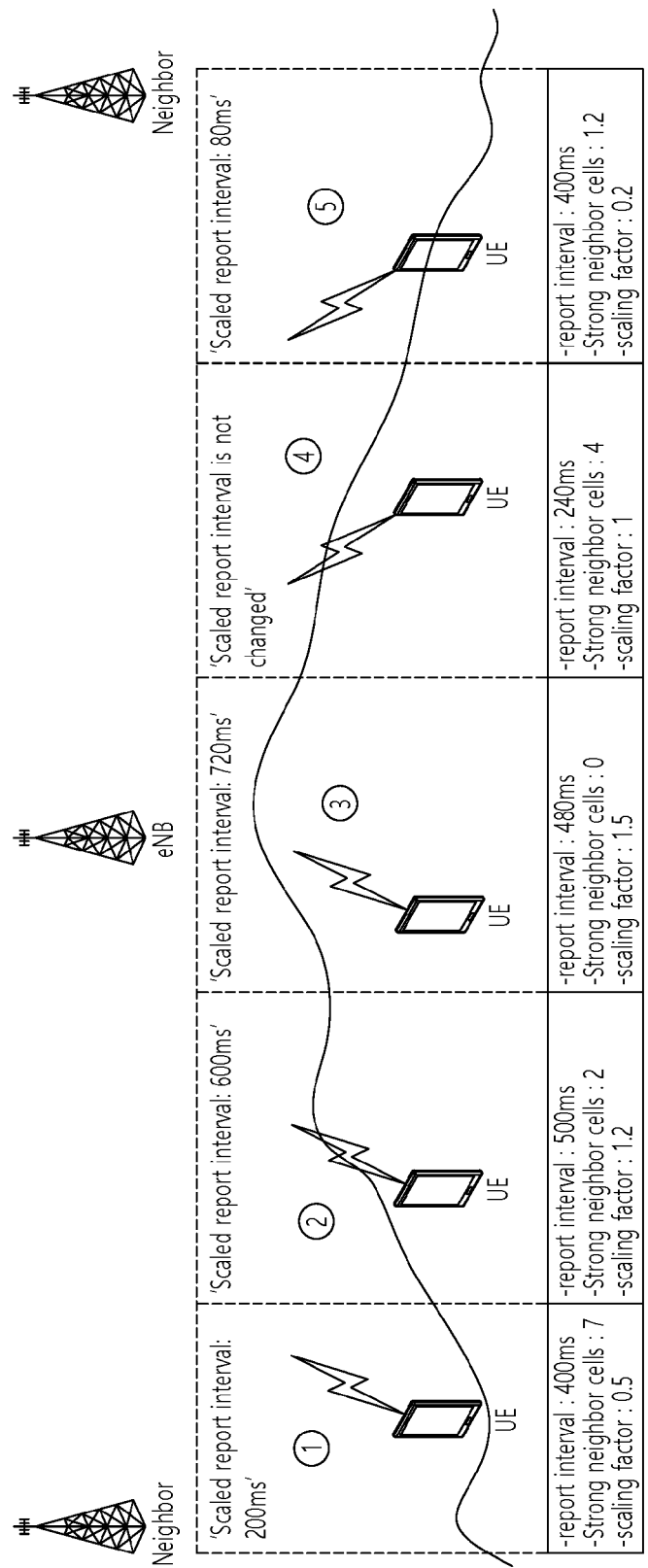

[Fig. 9]
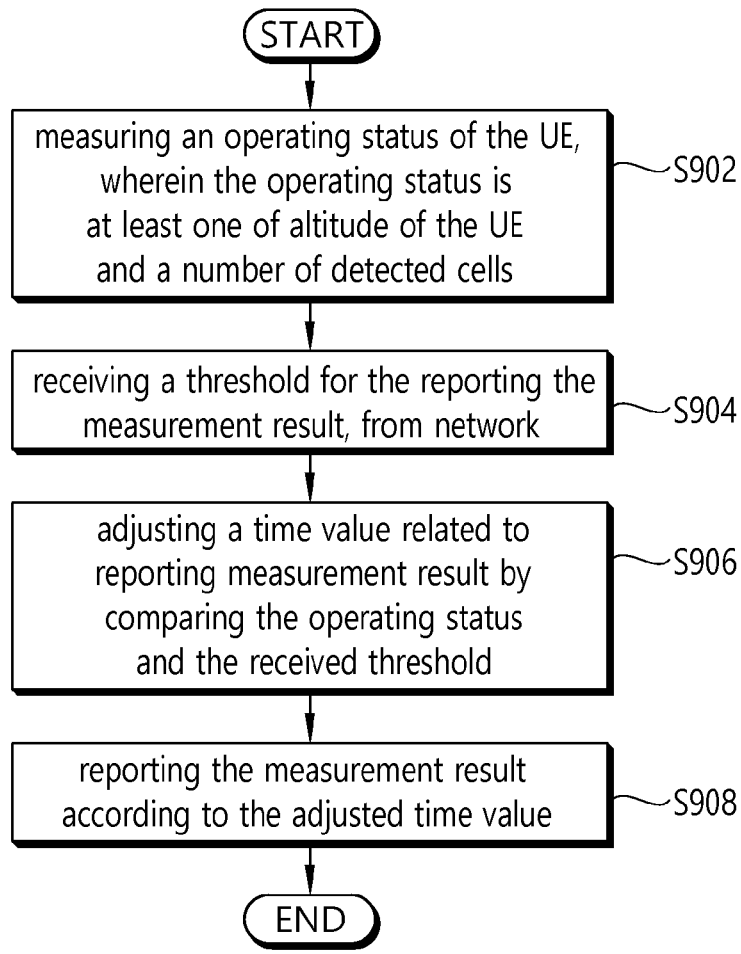
[Fig. 10]
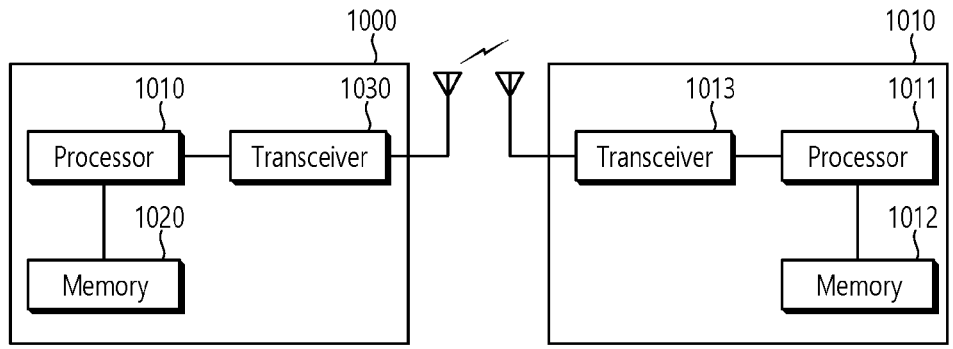

METHOD FOR REPORTING MEASUREMENT RESULT AND DEVICE SUPPORTING THE SAME

CROSS-REFERENCE TO RELATED APPLICATIONS

This application is a National Stage application under 35 U.S.C. § 371 of International Application No. PCT/KR2018/009256, filed on Aug. 13, 2018, which claims the benefit of U.S. Provisional Applications No. 62/544,005 filed on Aug. 11, 2017 and No. 62/563,136 filed on Sep. 26, 2017. The disclosures of the prior applications are incorporated by reference in their entirety.

BACKGROUND OF THE INVENTION

Field of the Invention

The present invention relates to a wireless communication system, and more particularly, to a method for reporting measurement result and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, there have been increasing interests in covering the aerial vehicles such as drones with cellular networks. The use cases of commercial drones are growing very rapidly and include package delivery, search-and-rescue, monitoring of critical infrastructure, wildlife conservation, flying cameras, and surveillance.

Furthermore, there are two types of "drone UE" are more considered in the field. One is a drone equipped with a cellular module certified for aerial usage. On the other hand, there might be a drone carrying a cellular module that is only certified for terrestrial operation.

LTE is well positioned to serve aerial vehicles such as drones. In fact, there have been increasing field trials involving using LTE networks to provide connectivity to drones. It is predicted that a rapid and vast growth in the drone industry will bring new promising business opportunity for LTE operators.

SUMMARY OF THE INVENTION

According to a prior art, current LTE network system cannot support aerial UE's specific propagation characteristics or related interference coordination between aerial UE and legacy UE on the ground.

According to one embodiment of the present invention, a method for reporting, by a user equipment (UE), a measurement result in wireless communication system is provided. The method may comprise: measuring an operating status of the UE; receiving a threshold for the reporting the measurement result, from network; adjusting a time value related to the reporting the measurement result, by comparing the operating status and the received threshold; and reporting the measurement result according to the adjusted time value, wherein the operating status is at least one of altitude of the UE and a number of detected cells.

The method may further comprise: performing a measurement on at least one of neighbor cells.

The adjusting the time value may be adjusting the time value to be longer, if the operating status is lower than the received threshold.

The adjusting the time value may be adjusting the time value to be shorter, if the operating status is higher than the received threshold.

The threshold may be provided via a radio resource control (RRC) dedicate signal message.

The time value may be a period for reporting the measurement result, and wherein the operating status may be a number of detected cells whose qualities are above the threshold.

The method may further comprise: receiving scaling factors related to the number of the detected cells, and wherein the adjusting the time value may be scaling the period based on the scaling factor corresponding to the number of the detected cells.

The scaling factors are configured to be smaller as corresponding number of detected cells is bigger.

According to another embodiment of the present invention, a user equipment (UE) in a wireless communication system is provided. The UE may comprise: a transceiver for transmitting or receiving a radio signal; and a processor coupled to the transceiver, the processor configured to: measure an operating status of the UE; receive a threshold for a reporting a measurement result, from network; adjust a time value related to the reporting the measurement result, by comparing the operating status and the received threshold; and report the measurement result according to the adjusted time value, wherein the operating status is at least one of altitude of the UE and a number of detected cells.

The processor may be further configured to: perform a measurement on at least one of neighbor cells.

The processor may be configured to adjust the time value to be longer, if the operating status is lower than the received threshold.

The processor may be configured to adjust the time value to be shorter, if the operating status is higher than the received threshold.

The threshold may be provided via a radio resource control (RRC) dedicate signal message.

The time value may be a period for reporting the measurement result, and wherein the operating status is a number of detected cells whose qualities are above the threshold.

The processor may be further configured to: receive scaling factors related to the number of the detected cells, and wherein the adjusting the time value may be scaling the period based on the scaling factor corresponding to the number of the detected cells.

Advantageous Effects

According to embodiments of the present invention, when aerial UE or legacy UE which is equipped in the aerial UE is hovering around a spot or moving drifty from high altitude to low altitude at the edge of a base station boundary, the UE may report relatively fewer or more neighbor cell measurement results on a case-by-case situation i.e. scaling time to trigger measurementReport.

BRIEF DESCRIPTION OF THE DRAWINGS

FIG. 1 shows an example of a wireless communication system to which technical features of the present invention can be applied.

FIG. 2 shows another example of a wireless communication system to which technical features of the present invention can be applied.

FIG. 3 shows a block diagram of a user plane protocol stack to which technical features of the present invention can be applied.

FIG. 4 shows a block diagram of a control plane protocol stack to which technical features of the present invention can be applied.

FIG. 5 shows an example of a method for reporting measurement result according to an embodiment of the present invention to avoid ping-pong handover problem.

FIG. 6 shows an example of a method for reporting measurement result according to an embodiment of the present invention to avoid late handover problem.

FIG. 7 shows an example of a method for reporting measurement result according to another embodiment of the present invention.

FIG. 8 shows an example of a method for reporting measurement result according to another embodiment of the present invention.

FIG. 9 shows an example of a method for reporting measurement result according to an embodiment of the present invention.

FIG. 10 shows a communication system to implement an embodiment of the present invention.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MIME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 0.4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

There have been increasing interests in covering the aerial vehicles such as drones with cellular networks. The use cases of commercial drones are growing very rapidly and include package delivery, search-and-rescue, monitoring of critical infrastructure, wildlife conservation, flying cameras, and surveillance.

Furthermore, there are two types of "drone UE" are more considered in the field. One is a drone equipped with a cellular module certified for aerial usage. On the other hand, there might be a drone carrying a cellular module that is only certified for terrestrial operation.

LTE is well positioned to serve aerial vehicles such as drones. In fact, there have been increasing field trials involving using LTE networks to provide connectivity to drones. It is predicted that a rapid and vast growth in the drone industry will bring new promising business opportunity for LTE operators.

In LTE specification, an air-borne UE, UAV, is sort of drone which is able to fly within cellular network. These air-borne UEs may experience radio propagation characteristics that are likely to be different from those experienced by a UE on the ground:

UL interference: The UL signal from the aerial vehicle may become more visible to multiple cells due to line-of-sight propagation conditions. The UL signal from an aerial vehicle may increase interference in the neighbor cells.

DL interference: Similarly due to line-of-sight propagation, the air-borne Aerial Vehicles may receive strong DL signal from neighboring cells.

However current LTE network system cannot support aerial UE's specific propagation characteristics or related interference coordination between aerial UE and legacy UE on the ground. Thus, it is definitely needed a way handling proper mobility support in the high altitude.

Hereinafter, a method for reporting measurement result according to an embodiment of the present invention. According to an embodiment of the present invention, when aerial UE or legacy UE which is equipped in the aerial UE is hovering around a spot or moving drifty from high altitude to low altitude at the edge of a base station boundary, the UE may report relatively fewer or more neighbor cell measurement results on a case-by-case situation i.e. scaling time to trigger measurementReport.

To report neighbor cell measurement results relatively on a case-by-case situation, the UE may use time-to-trigger value using scaling factor to set the time-to-trigger value relatively longer or shorter by UE itself or network configuration. In this description, the time-to-trigger value may be referred as a time value related to reporting measurement result. The base station may provide a threshold or event reporting configuration for scaling the time-to-trigger value. If the network has intention to scale the time-to-trigger value by UE, the network may provide threshold(s) for scaling time-to-trigger value. On the other hand, if the network has intention to scale the time-to-trigger value by the network configuration, the network may provide a measurement event reporting configuration for scaling time-to-trigger value by network. The detailed descriptions are below:

1) Providing threshold(s) for scaling time-to-trigger value by UE

The network may provide some threshold for scaling time-to-trigger value in the RRC dedicated signal message i.e. RRCConnectionSetup, RRCConnectionResume, RRCConnectionReconfiguration. These thresholds may be related to at least one of altitude, horizontal speed, vertical speed, the detected number of cells. These thresholds may also have purpose and, following the threshold purpose, the base station may indicate to the UE that this threshold is using for negative scaling time-to-trigger value i.e. relatively fewer triggering measurement report or positive scaling time-to-trigger value i.e. relatively more frequent triggering measurement report. For this, the UE may measure a value for a current status of the UE, such as altitude, horizontal speed, vertical speed, the detected number of cells. For example, if the network provide a threshold related to the altitude, the UE may measure the altitude as the current status of the UE. If the network provide a threshold related to the detected number of cell, the UE may measure the detected number of cell as the current status of the UE. Then the UE may compare the measured result and the corresponding threshold. If measured result is lower than the given threshold for negative scaling, the UE may set time-to-trigger value to a relatively longer value in order to avoid frequent ping-pong handover problem. If measured result is higher than the given threshold for positive scaling, the UE set time-to-trigger value to a relatively shorter value to avoid late handover i.e. radio link failure.

2) Providing a measurement event reporting configuration for scaling time-to-trigger value by network The network may provide a measurement event reporting configuration including the threshold which is used to scaling time-to-trigger value in option 1). The event reporting configuration may be included in the RRC dedicated signal message i.e. RRCConnectionSetup, RRCConnectionResume, RRCConnectionReconfiguration. The event reporting configuration may include thresholds related to at least one of altitude, horizontal speed, vertical speed, the detected number of cells. These thresholds also have purpose and, following the threshold purpose, the base station indicates to the UE that this threshold is using for negative scaling time-to-trigger value i.e. relatively fewer triggering measurement report or positive scaling time-to-trigger value i.e. relatively more frequent triggering measurement report. For this, the UE may measure a value for a current status of the UE, such as altitude, horizontal speed, vertical speed, the detected number of cells. For example, if the network provided a threshold related to the altitude, the UE may measure the altitude as the current status of the UE. If the network provided a threshold related to the detected number of cell, the UE may measure the detected number of cell as the current status of the UE. Then the UE may compare the measured result and the corresponding threshold. If measured result is lower than the given threshold and fulfil the event report conditions for negative scaling, the network set time-to-trigger value to a relatively longer value in order to avoid frequent ping pong handover problem between the serving cell and neighbor cell. If measured result is higher than the given threshold and fulfil the event report conditions for positive scaling, the network set time-to-trigger value to a relatively shorter value in order to avoid late handover problem between the serving cell and neighbor cell.

FIG. 5 shows an example of a method for reporting measurement result according to an embodiment of the present invention to avoid ping-pong handover problem. Referring to FIG. 5, cell #1 and cell #2 may be overlapped in the air. When the hovering aerial UE is located in the overlapped region, it is difficult to determine which cell provides signal with better quality. In this case, there may be frequent handover between cell #1 and cell #2, and there may be frequent measurement report as well. However, such frequent measurement reporting may cause power waste. Thus, the UE need to adjust the frequency of measurement report. According to an embodiment of the present invention, the UE may report measurement result less often, to prevent the frequent ping-pong problem.

FIG. 6 shows an example of a method for reporting measurement result according to an embodiment of the present invention to avoid late handover problem. Referring FIG. 6, the hovering aerial UE may move through overlapped region of cell #1 and cell #2, toward cell #2. In specific, the UE is located more close to the cell #2 than cell #1, but the signal between the UE and the cell #1 is still strong. In this case, the UE may determine that the UE does not have to perform handover to cell #2. Thus, if the UE keeps moving toward cell #2, a late handover problem i.e. radio link failure may occur, because the measurement report for handover is delayed. Thus, the UE need to adjust the frequency of measurement report. According to an embodiment of the present invention, the UE may report measurement result more often, to prevent the late handover.

Meanwhile, the UL/DL interferences would be worse as much as close to cell edge region which is disclosed to strong neighbor cells. On the other hand, These UL/DL interferences would be better as much as close to cell center region. Thus, periodicity of measurement report is one of important issue to handle that type of the air-borne UE which are suffering with these UL/DL interferences. If the air-borne UE is located at the cell edge region or heading to the cell edge region, the network may need to acquire more measurement information than information from the cell center region. If the air-borne UE is located at the cell center region or heading to the cell center region, the network may not need to acquire more measurement information than information from the cell edge region.

The problem is that network based configuration for measurement report may be not so appropriate to the air-borne UEs because the suffering interference situation can be deviated even in a periodic time to serving cell's measurement report following the drift change of altitude or speeds. A solution is needed to handling periodic reporting for air-borne UE's measurement.

Hereinafter, a method for reporting measurement result according to another embodiment of the present invention is described. According to another embodiment of the present invention, the UE may receive measurement reporting configuration including a reporting periodicity and a threshold. Further, the UE may determine one or more neighboring cells of which quality is above the threshold.

Further, the UE may periodically report a measured result by adjusting the configured reporting periodicity based on the number of the determined neighboring cells. The measured result may be the number of the determined neighboring cells and/or the qualities of the determined neighboring cells.

FIG. 7 shows an example of a method for reporting measurement result according to another embodiment of the present invention.

In step S702, when eNB or gNB configures measurement and/or reporting of detected strong neighboring cells, eNB or gNB may signal a reporting interval, e.g. period, and a threshold to a UE. In addition, eNB or gNB may signal a scaling factor to a UE. For example, the scaling factor value may be mapped to a certain number(s) of detected strong neighboring cells as shown in Table 1. In this description, the strong neighboring cell or the strong cells may indicate cells whose qualities are above the threshold received from the network.

TABLE 1

| Number of detected strong cells | 10 more | 6~10 | 3~5 | 1~2 | 0 |
|---|---|---|---|---|---|
| Scaling Factor | 0.2 | 0.5 | 1 | 1.2 | 1.5 |

In step 704, the UE may scale the reporting interval based on a scaling factor corresponding to a number of cells whose qualities are above the threshold.

In specific, the scaling the received period may be performed as follow. If UE is configured with detected strong neighboring cells within the corresponding reportConfig for this measId, UE shall:
  if the reportInterval was not previously set:
    set the reportInterval to the signaled reporting interval
  else (the reportInterval was previously set as shown below):
    set the reportInterval by multiplying the signaled reporting interval with the scaling factor.
  determine detected strong neighbouring cells above the threshold which are provided by lower layers in the reportInterval;
  determine the number of the detected strong neighbouring cells in the reportInterval;
  determine the scaling factor based on the determined number of the detected strong neighbouring cells for the next reportInterval.

The reportInterval may correspond to the received period, and the next reportInterval may correspond to the scaled period.

In step S706, the UE may start timer which is set based on the scaled reporting interval. In specific, the UE may start the periodical reporting timer configured based on the scaled period, as follows:
  if the numberOfReportsSent as defined within the VarMeasReportList for this measId is less than the reportAmount as defined within the corresponding reportConfig for this measId, UE shall:
    start the periodical reporting timer with the value of reportInterval as defined within the corresponding reportConfig for this measId;
  else:
    if the triggerType is set to periodical:
      remove the entry within the VarMeasReportList for this measId;
      remove this measId from the measIdList within VarMeasConfig;

As described above, the periodical reporting timer may be set according to the value of the reportInterval.

In step S708, upon expiry of the periodical reporting timer for this measId, UE may initiate the measurement reporting procedure in which UE transmits a measurement reporting message including the determined detected strong neighboring cells and/or the determined number of the detected strong neighboring cells in the reportInterval.

FIG. 8 shows an example of a method for reporting measurement result according to another embodiment of the present invention.

In region ①, the UE may receive a measurement reporting configuration. The measurement reporting configuration may include the report interval, the scaling factor and relationship between the scaling factors and the number of strong neighbor cells. The UE may detect the strong neighbor cells. According to an embodiment of the present invention, the report interval may be 400 ms, and the number of strong neighbor cells may be 7. Referring to the Table 2 shown below, the scaling factor corresponding to the number of strong neighbor cells (7) may be 0.5. In this embodiment, the scaled report interval may be 200 ms, because the UE may scale the report interval by multiplying the report interval and the scaling factor.

Table 2 shows an example of relationship between the number of strong neighbor cells and the scaling factor. According to an embodiment of the present invention, the more number of strong cell is detected, the more interference may occur.

TABLE 2

| Number of detected strong cells | 10 more | 6~10 | 3~5 | 1~2 | 0 |
|---|---|---|---|---|---|
| Scaling Factor | 0.2 | 0.5 | 1 | 1.2 | 1.5 |

In region ②, the UE may receive a new measurement reporting configuration, which includes the report interval, the scaling factor and relationship between the scaling factors and the number of strong neighbor cells. According to an embodiment of the present invention, the report interval may be 500 ms, and the number of strong neighbor cells may be 2. Referring to the Table 2 shown below, the scaling factor corresponding to the number of strong neighbor cells (2) may be 1.2. In this embodiment, the scaled report interval may be 600 ms, by the same way in the region 1.

In region ③, the UE may receive a new measurement reporting configuration, which includes the report interval, the scaling factor and relationship between the scaling factors and the number of strong neighbor cells. According to an embodiment of the present invention, the report interval may be 480 ms, and the number of strong neighbor cells may be 0. Referring to the Table 2 shown below, the scaling factor corresponding to the number of strong neighbor cells (0) may be 1.5. In this embodiment, the scaled report interval may be 720 ms.

In region ④, the UE may receive a new measurement reporting configuration, which includes the report interval, the scaling factor and relationship between the scaling factors and the number of strong neighbor cells. According to an embodiment of the present invention, the report interval may be 240 ms, and the number of strong neighbor cells may be 4. Referring to the Table 2 shown below, the scaling factor corresponding to the number of strong neighbor cells (4) may be 1. In this embodiment, the scaled report interval may be maintained as same as in the region 3, e.g. 720 ms.

In region ⑤, the UE may receive a new measurement reporting configuration, which includes the report interval, the scaling factor and relationship between the scaling factors and the number of strong neighbor cells. According to an embodiment of the present invention, the report interval may be 400 ms, and the number of strong neighbor cells may be 12. Referring to the Table 2 shown below, the scaling factor corresponding to the number of strong neighbor cells (12) may be 0.2. In this embodiment, the scaled report interval may be 80 ms.

FIG. 9 shows an example of a method for reporting measurement result according to an embodiment of the present invention.

In step S902, the UE may measure an operating status of the UE. The operating status may be at least one of altitude of the UE and a number of detected cells.

In step S904, the UE may receive a threshold for the reporting the measurement result, from network. The threshold may be provided via a radio resource control (RRC) dedicate signal message In step S906, the UE may adjust a time value related to the reporting the measurement result by comparing the operating status and the received threshold. The UE may adjust the time value to be longer, if the operating status is lower than the received threshold. The UE may adjust the time value to be shorter, if the operating status is higher than the received threshold.

In step S908, the UE may report the measurement result according to the adjusted time value.

Further, the UE may perform a measurement on at least one of neighbor cells.

The time value may be a period for reporting the measurement result, and wherein the operating status is a number of detected cells whose qualities are above the threshold. The UE may receive scaling factors related to the number of the detected cells, and wherein the adjusting the time value may be scaling the period based on the scaling factor corresponding to the number of the detected cells. The scaling factors may be configured to be smaller as corresponding number of detected cells is bigger.

FIG. 10 shows a communication system to implement an embodiment of the present invention.

A UE 1000 includes a processor 1001, a memory 1002, and a transceiver 1003. The memory 1002 is coupled to the processor 1001, and stores a variety of information for driving the processor 1001. The transceiver 1003 is coupled to the processor 1001, and transmits and/or receives a radio signal. The processor 1001 implements the proposed functions, procedures, and/or methods. In the aforementioned embodiments, an operation of the first network node may be implemented by the processor 1001.

A network node 1010 includes a processor 1011, a memory 1012, and a transceiver 1013. The memory 1012 is coupled to the processor 1011, and stores a variety of information for driving the processor 1011. The transceiver 1013 is coupled to the processor 1011, and transmits and/or receives a radio signal. The processor 1011 implements the proposed functions, procedures, and/or methods. In the aforementioned embodiments, an operation of the second network node 1010 may be implemented by the processor 1011.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

The invention claimed is:

1. A method for reporting, by a user equipment (UE), a measurement result in wireless communication system, the method comprising:

measuring an operating status of the UE;

receiving a threshold for the reporting the measurement result, from network;

adjusting a time value related to the reporting the measurement result, by comparing the operating status and the received threshold; and reporting the measurement result according to the adjusted time value, wherein the operating status is at least one of altitude of the UE and a number of detected cells.

2. The method of claim 1, further comprising:

performing a measurement on at least one of neighbor cells.

3. The method of claim 1, wherein the adjusting the time value is adjusting the time value to be longer, if the operating status is lower than the received threshold.

4. The method of claim 1, wherein the adjusting the time value is adjusting the time value to be shorter, if the operating status is higher than the received threshold.

5. The method of claim 1, wherein the threshold is provided via a radio resource control (RRC) dedicate signal message.

6. The method of claim 1, wherein the time value is a period for reporting the measurement result, and wherein the operating status is a number of detected cells whose qualities are above the threshold.

7. The method of claim 6, further comprising:

receiving scaling factors related to the number of the detected cells, and wherein the adjusting the time value is scaling the period based on the scaling factor corresponding to the number of the detected cells.

8. The method of claim 7, wherein the scaling factors are configured to be smaller as corresponding number of detected cells is bigger.

9. The method of claim 1, wherein the UE communicates with at least one of a mobile terminal, a network or autonomous vehicles other than the UE.

10. A user equipment (UE) in a wireless communication system, the UE comprising:
   a transceiver for transmitting or receiving a radio signal; and
   a processor coupled to the transceiver,
   the processor configured to:
   measure an operating status of the UE;
   receive a threshold for a reporting a measurement result, from network;
   adjust a time value related to the reporting the measurement result, by comparing the operating status and the received threshold; and
   report the measurement result according to the adjusted time value,
   wherein the operating status is at least one of altitude of the UE and a number of detected cells.

11. The UE of claim 10, wherein the processor is further configured to:
   perform a measurement on at least one of neighbor cells.

12. The UE of claim 10, wherein the processor is configured to adjust the time value to be longer, if the operating status is lower than the received threshold.

13. The UE of claim 10, wherein the processor is configured to adjust the time value to be shorter, if the operating status is higher than the received threshold.

14. The UE of claim 10, wherein the threshold is provided via a radio resource control (RRC) dedicate signal message.

15. The UE of claim 10, wherein the time value is a period for reporting the measurement result, and wherein the operating status is a number of detected cells whose qualities are above the threshold.

16. The UE of claim 15, wherein the processor is further configured to:
   receive scaling factors related to the number of the detected cells, and
   wherein the adjusting the time value is scaling the period based on the scaling factor corresponding to the number of the detected cells.

* * * * *